United States Patent
Park et al.

(10) Patent No.: US 9,239,818 B2
(45) Date of Patent: Jan. 19, 2016

(54) IMAGE FORMING DEVICE FOR SERVING A WEB SERVICE AND METHOD THEREOF

(71) Applicant: Samsung Electronics Co., Ltd., Suwon-si, Gyeonggi-do (KR)

(72) Inventors: Hyun-cheol Park, Hwaseong-si (KR); Ho-ick Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 451 days.

(21) Appl. No.: 13/687,652

(22) Filed: Nov. 28, 2012

(65) Prior Publication Data

US 2013/0139049 A1  May 30, 2013

(30) Foreign Application Priority Data

Nov. 29, 2011 (KR) .................. 10-2011-0126337

(51) Int. Cl.
*G06F 17/20* (2006.01)
*H04N 1/00* (2006.01)
*H04N 1/32* (2006.01)

(52) U.S. Cl.
CPC ............ *G06F 17/20* (2013.01); *H04N 1/00244* (2013.01); *H04N 1/00464* (2013.01); *H04N 1/00474* (2013.01); *H04N 1/32106* (2013.01); *H04N 2201/001* (2013.01); *H04N 2201/0094* (2013.01); *H04N 2201/3204* (2013.01); *H04N 2201/3208* (2013.01); *H04N 2201/328* (2013.01); *H04N 2201/3274* (2013.01); *H04N 2201/3278* (2013.01)

(58) Field of Classification Search
CPC .............. G06F 17/02; H04N 1/00244; H04N 1/00464; H04N 1/00474; H04N 1/32106; H04N 2201/001; H04N 2201/0094; H04N 2201/3204; H04N 2201/3208; H04N 2201/3274; H04N 2201/3278; H04N 2201/328
See application file for complete search history.

(56) References Cited

U.S. PATENT DOCUMENTS

| | | | |
|---|---|---|---|
| 2002/0023099 A1* | 2/2002 | Wendelrup | 707/200 |
| 2003/0186211 A1* | 10/2003 | Tadokoro et al. | 434/350 |
| 2006/0077444 A1* | 4/2006 | Lum et al. | 358/1.15 |
| 2007/0064683 A1* | 3/2007 | Furukawa | H04N 1/00204 370/352 |
| 2007/0159663 A1* | 7/2007 | Tsujimoto | 358/448 |
| 2008/0091800 A1* | 4/2008 | Sorrentino et al. | 709/219 |
| 2008/0270911 A1* | 10/2008 | Dantwala | G06Q 10/10 715/741 |
| 2009/0199011 A1* | 8/2009 | Kawara | 713/176 |
| 2011/0154227 A1* | 6/2011 | Kang | G06F 3/1204 715/760 |
| 2011/0157643 A1* | 6/2011 | Shozaki | G06F 21/608 358/1.15 |
| 2011/0161823 A1* | 6/2011 | Miyata | H04N 1/00204 715/733 |
| 2012/0120447 A1* | 5/2012 | Yoshida | H04N 1/00127 358/1.15 |

OTHER PUBLICATIONS

IE9 Product Guide—Excerpt—dated Mar. 9, 2011; for better tabbed page resolution, see Time Snapshot—Tabbed Page pdf below.*
IE9 Product Guide—Time Snapshot—Tabbed Page Excerpt—dated Mar. 9, 2011.*
European Search Report dated Feb. 26, 2013 in corresponding European Patent Application 12190633.3.

* cited by examiner

*Primary Examiner* — Amy M Levy
(74) *Attorney, Agent, or Firm* — Staas & Halsey LLP

(57) ABSTRACT

An image forming device includes a storage unit registering information on at least one server, a communication unit connected to at least one server registered in the storage via a network and receiving application information, a UI processing unit configuring an integrated UI displaying applications supported by at least one server, a display unit displaying the integrated UI and a control unit, if an application is selected from the integrated UI, requesting a web service to a server supporting the selected application. Therefore, convenience in the use of web services may increase.

17 Claims, 9 Drawing Sheets

IMAGE FORMING DEVICE FOR SERVING A WEB SERVICE AND METHOD THEREOF

CROSS-REFERENCE TO RELATED APPLICATIONS

This application claims the priority benefit of Korean Patent Application No. 10-2011-0126337 under 35 U.S.C. §119(a), which was filed on Nov. 29, 2011, in the Korean Intellectual Property Office, the entire disclosure of which is incorporated herein by reference.

BACKGROUND

1. Field

The following description relates to an image forming device for serving a web service and a method thereof and, more specifically, to an image forming device for serving a web service using an integrated user interface (UI) for web services and a method thereof.

2. Description of the Related Art

Thanks to the development of electronic technologies, various kinds of electronic apparatuses have been developed and provided. In particular, tasks in office environments have become increasingly computerized, and numerous kinds of computer peripherals are now being used.

A case in point is an image forming device. An image forming device refers to a device which forms an image on paper or other various recording media, such as a printer, a scanner, a copy machine, a facsimile machine, or a multi-functional peripheral (MFP), for example. A cutting-edge image forming device connected to a network can support web services provided by various web servers. The image forming device accesses the web servers and loads UI data including types of applications installed on the web servers. The image forming device constitutes application UI using the loaded UI data, and then displays on a screen.

Such a UI is supported individually for every server. Accordingly, if a user does not find a desired application in a particular web server, the user has to input an address of another web server and confirm a UI thereof. Therefore, it has been inconvenient for a user to reference address information of each web server to take advantage of various applications provided by diverse web servers. In addition, a user has to remember what application is provided by which web server to easily select desired web services.

In particular, as users' needs have increased with respect to web services, the number of servers providing such web services has increased.

Accordingly, there is a need for methods for users to use web services more conveniently.

SUMMARY

Additional aspects and/or advantages will be set forth in part in the description which follows and, in part, will be apparent from the description, or may be learned by practice of the invention.

Accordingly, the following description addresses the above-mentioned disadvantages occurring in the prior art and other related disadvantages not described above. The following description relates to an image forming device and a method thereof, in which servers are registered in advance and an integrated user interface (UI) for applications supported by the registered servers is provided to improve user convenience in connection with the use of web services.

According to an exemplary embodiment, an image forming device includes a storage unit which registers information on at least one server, a communication unit which is connected to at least one server registered in the storage unit via a network and which receives application information provided by the at least one server, a UI processing unit which constitutes an integrated UI to display applications supported by the at least one server by using the application information, a display unit which displays the integrated UI, and a control unit which, if an application is selected from the integrated UI, requests a web service to a server supporting the selected application.

The control unit may control the display unit to display a setting screen for server registration and store information on a server registered in the setting screen in the storage unit.

Herein, the setting screen may include a first area to input a server address, a second area to determine whether to display an application on the integrated UI, and a third area to set priorities among servers.

The control unit may control the display unit to display a waiting screen including a web service menu and, if the web service menu is selected, control the display unit to display the integrated UI.

Meanwhile, the control unit may control the UI processing unit to request application information to a server registered in the storage unit whenever the web service menu is selected, and to update the integrated UI by using application information received according to the request.

If a pre-defined event occurs, the control unit may control the UI processing unit to request the application information to the server registered in the storage unit and to compose the integrated UI by using application information received according to the request, and control the display unit to store the integrated UI composed by the UI processing unit in the storage unit and, if the web service menu is selected, to display the integrated UI stored in the storage unit.

The application information may be included in HTML data, and the control unit may extract information on an area defined by a body tag in the HTML data as the application information and provide the information to the UI processing unit.

Further, the control unit may parse a unique string pre-defined in data received from the server and extract data about an area specified by the unique string as the application information and provide the data to the UI processing unit.

The integrated UI may be embodied as a UI in which a selection menu of all applications supported by the at least one server is enumerated or in which tabs for each of the at least one server and an area of an application selection menu displayed in connection with a selection of each tab are included.

Meanwhile, a method for providing a web service of an image forming device according to an exemplary embodiment includes collecting application information from a plurality of servers registered in the image forming device, composing an integrated UI displaying applications supported by the plurality of servers by using the application information, displaying the integrated UI, and if an application is selected from the integrated UI, requesting a web service to a server supporting the selected application.

The method may further include displaying a setting screen for server registration and storing information on a server registered on the setting screen.

The setting screen may include a first area to input a server address, a second area to determine whether to display an application in the integrated UI, and a third area to set priorities among servers.

The method may further include displaying a waiting screen including a web service menu and, if the web service menu is selected on the waiting screen, requesting the application information to the registered server.

The method may further include, if a pre-defined event occurs, requesting the application information to the registered server and, if the integrated UI is composed by using application information received according to the request, storing the integrated UI.

The method may further include, if HTML data is received from the registered server, extracting information input in a body tag within the HTML data as the application information.

If data is received from the registered server, the method may further include parsing a pre-defined unique string within the received data and extracting data of an area specified by the unique string as the application information.

Meanwhile, the integrated UI may be a UI in which a selection menu of all applications supported by the at least one server is enumerated or in which tabs for each of the at least one server and an area of an application selection menu displayed in connection with a selection of each tab are included.

Meanwhile, regarding a recording medium storing a program to perform a method for providing a web service, the method for providing a web service may include receiving application information from a plurality of registered servers, composing an integrated UI displaying applications supported by the plurality of servers by using the application information, displaying the integrated UI and, if an application is selected from the integrated UI, requesting a web service to a server supporting the selected application.

According to various exemplary embodiments, because a user may select applications of a variety of servers from an integrated UI, user convenience may be improved significantly.

BRIEF DESCRIPTION OF THE DRAWINGS

The above and other features, aspects, and advantages of the present invention will be more apparent from the following detailed description taken in conjunction with the accompanying drawings, in which.

DETAILED DESCRIPTION

Hereinafter, embodiments of the present invention will be described in greater detail with reference to the accompanying drawings, in which aspects of the present invention are illustrated.

Figure 1:
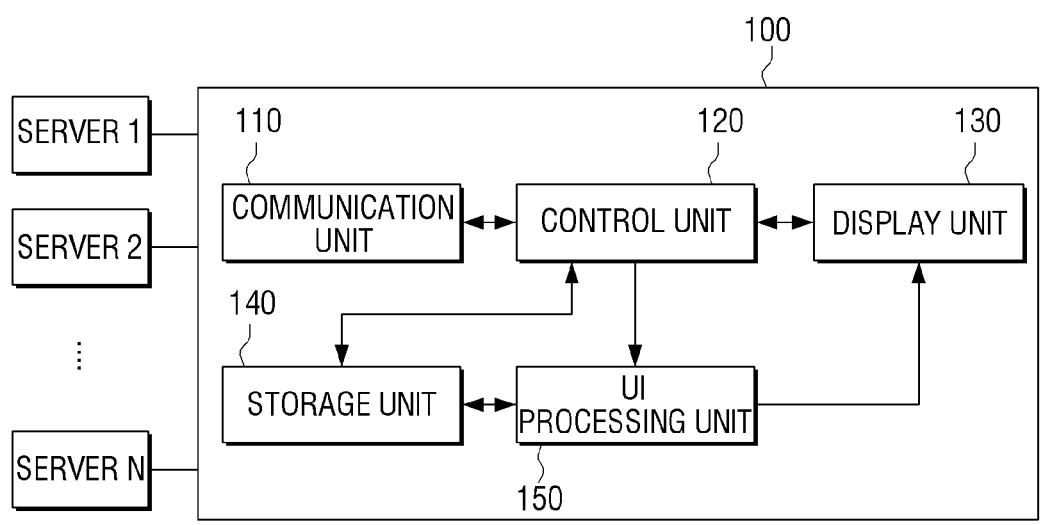
FIG. 1 is a block diagram of a configuration of an image forming device according to an exemplary embodiment.

FIG. 1 is a block diagram of a configuration of an image forming device according to an exemplary embodiment. Referring to FIG. 1, the image forming device 100 includes a communication unit 110, a control unit 120, a display unit 130, a storage unit 140, and a UI processing unit 150. The communication unit 110 communicates with external servers (servers 1 to n) via a network. The communication unit 110 may communicate with the external servers using various web service protocols such as TCP/IP (Transmission Control Protocol/Internet Protocol), HTTP (HyperText Transfer Protocol), HTTPS (Hypertext Transfer Protocol over Secure Socket Layer), SOAP (Simple Object Access Protocol), or XML-RPC (XML Remote Procedure Call), for example.

Herein, a server refers to a server equipped with an application which can provide a web service. Recently, a demand for a user-customized environment in an image forming device has increased. Accordingly, there is provided an environment where a user directly creates an application which can be employed in an image forming device and distributes it by open platforms. Such an application is installed and executed in an external server, not in an image forming device, and the execution result is provided to an image forming device. Accordingly, the image forming device 100 may display various web pages provided by the application which is executed in the external server, and a user may use functions of the application using the web pages.

Information on the server may be registered in the storage unit 140. That is, the storage unit 140 stores various programs and data which are executed in the image forming device 100. If a user has registered a server, information on the server is also stored in the storage unit 140.

The control unit 120 controls the communication unit 110 to link a communication with a server registered in the image forming device 100.

The communication unit 110 is connected to a server registered in the storage unit 140 via a network according to a control of the control unit 120 and receives application information provided by the server. Specifically, the communication unit 110 makes a request for transmission of data including address information of a server stored in the storage unit 140, namely application information, after confirming a URL and then accessing the server. Application information may include diverse information, such as types of applications and associated icons installed in the corresponding server, or a UI menu, for example.

The control unit 120 controls the UI processing unit 150 to compose an integrated UI if data including application information is received through the communication unit 110. The control unit 120 may extract application information from the received data and provide the information to the UI processing unit 150. If the data is written in HTML, the control unit 120 may extract data written in an area defined by a specific tag, such as a body tag, for example, as application information. The control unit 120 may extract data written in an area defined by a pre-defined unique string as application information. Further details related to this process will be provided in the following description.

According to exemplary embodiments, collecting application information and composing an integrated UI using the collected application information may be performed each time a user employs web services. The integrated UI is performed at a specific point in time and then is constituted and stored, and the user may employ the stored integrated UI by reading it when using the web services. The specific point in time may refer to the time when a server is registered, the registration is cancelled, the server address changes, an image forming device is turned on after being turned off or reset, a user command for updating an integrated UI is input, a change of application occurs in at least one of servers, or a pre-set time arrives, for example.

The UI processing unit 150 uses application information received from each server to compose an integrated UI which displays all applications supported by each server. An integrated UI may be configured in various manners and further details relating to the UI will be provided in the following description. The integrated UI configured in the UI processing unit 150 is stored in the storage unit 140. Thus, the storage unit 140 may function as a kind of web server replacing a role of an existing registered server.

The display unit 130 displays an integrated UI configured in the UI processing unit 150. The display unit 130 may display an integrated UI by reading it from the storage unit 140 when a pre-defined event takes place. Herein, the event may include various cases including when an image forming device is turned on or reset, a new server is registered or the registration is cancelled, or a web service menu is selected, for example. The display unit 130 may be realized as a touch screen. A user may select a menu by directly touching it on a waiting screen or an integrated UI.

Meanwhile, in the case of an exemplary embodiment in which the display unit 130 is not realized as a touch screen, additional input elements, such as arrow keys and selection keys, are equipped in a main body of the image forming device 100 so that a user may operate the input elements and select a menu.

If an application is selected in the integrated UI, the control unit 120 requests a web service to a server supporting the selected application. If the application selected from the integrated UI is installed in Server 1, the control unit 120 transmits a request for execution of the application to Server 1. Server 1 executes the application according to the request for application execution and transmits data to display a web page to the communication unit 110. If the data is received through the communication unit 110, the control unit 120 controls the UI processing unit 150 and the display unit 130 to compose the web page and display the same on a screen. Accordingly, if one of various menus displayed on the web page is selected, the control unit 120 requests Server 1 to perform an operation corresponding to the selected menu. In this way, a web service by an application which is selected from an integrated UI may be supported.

Figure 2:
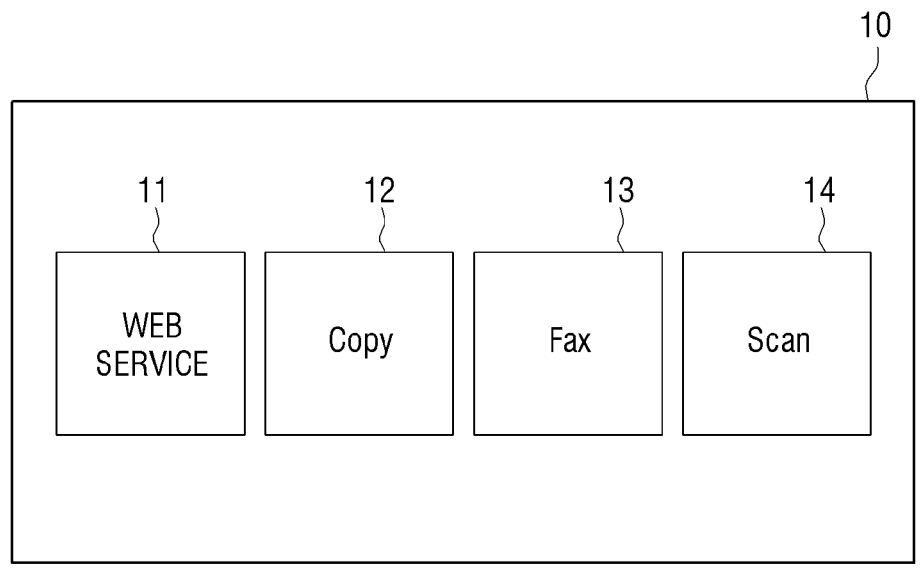
FIG. 2 illustrates an example of configurations of a waiting screen.

FIG. 2 illustrates an example of a configuration of a waiting screen displayed on the image forming device 100. As illustrated in FIG. 2, if the image forming device 100 is turned on, a waiting screen 10 including menus 11 to 14 which can be selected by a user is displayed on a screen. The waiting screen 10 displays various functions supported by the image forming device 100. In the case of the image forming device 100 supporting web services, a web service menu 11 may be included as illustrated in FIG. 2. If a user selects the web service menu 11, an integrated UI is displayed on a screen of the image forming device 100.

Figure 3:
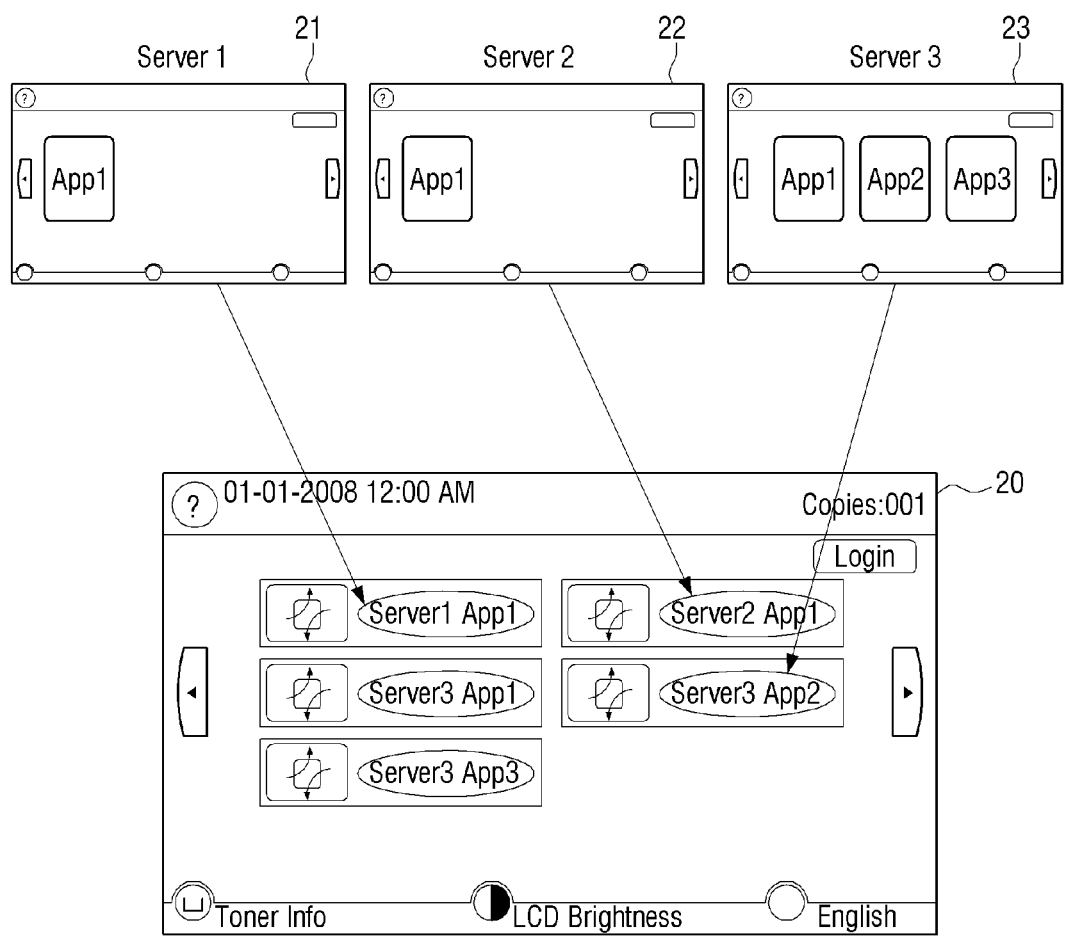
FIG. 3 illustrates an example of an integrated UI which integrates applications of a plurality of servers.

FIG. 3 illustrates an example of a configuration of an integrated UI. Referring to FIG. 3, Server 1 and Server 2 support one application, respectively, and Server 3 supports three applications. UIs provided by Servers 1, 2, and 3 are basically individual UIs 21, 22, and 23 displaying each corresponding application. The image forming device 100 does not display the individual UIs 21, 22, and 23, but configures an integrated UI 20 and displays the same.

In other words, the integrated UI 20 displays selection menus for application 1 supported by Server 1 (Server 1 App 1), application 1 supported by Server 2 (Server 2 App 1) and applications 1, 2, and 3 supported by Server 3 (Server 3 App 1, Server 3 App 2, and Server 3 App 3). Referring to FIG. 3, each of the selection menus is shown in a form of an image and a text, but the selection menus may be displayed as an icon or other forms. The display forms of each selection menu may be used as defined in the individual UIs 21, 22, and 23. That is, application information may include not only a name and a type of each application, but also attribute information such as a form, a color, or a size, for example, of a selection menu. The image forming device 100 may configure the integrated UI 20 reflecting such attribute information.

Meanwhile, as described above, applications displayed on the integrated UI 20 are supported by servers registered in the image forming device 100. A server may be registered if a user selects a setting menu. Even though it is not illustrated in FIG. 2, the setting menu may be displayed on a waiting screen. When a web service menu is selected from a waiting screen, the setting menu may be displayed together on the integrated UI. Also, according to exemplary embodiments, keys equipped in the main body of the image forming device 100 may be used as keys for the setting menu.

Figure 4:
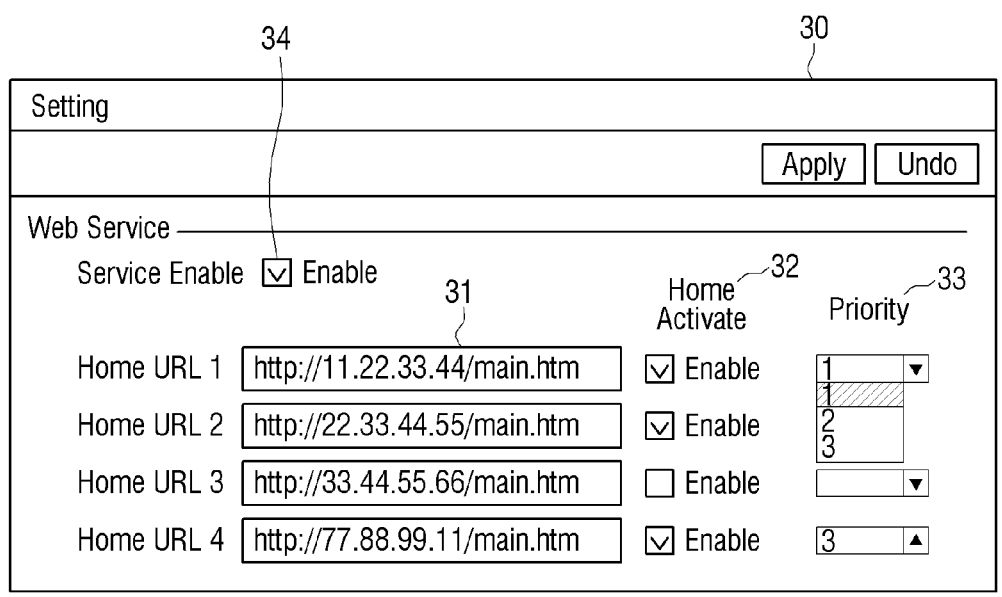
FIG. 4 illustrates an example of configurations of a setting screen for server registration.

FIG. 4 illustrates an example of a configuration of a setting screen. Referring to FIG. 4, the setting screen 30 may include a first area 31 to input an address of a server, a second area 32 to determine whether to display an application of the input server on an integrated UI, a third area 33 to set priorities among servers, and a fourth area 34 to determine whether to activate a web service menu. Herein, a type, a number, and a form of an area may be variable according to the exemplary embodiments, and other areas may be added or a portion of the areas may be omitted. In particular, at least one of the second to fourth areas may be omitted.

A user inputs home URLs of a plurality of application servers provided by the image forming device 100 in the first area 31. If a user wants to include an application of an input server in an integrated UI, the user should check the second area 32. If the second area 32 has been checked, the third area 33 may be displayed. In the third area 33, the user may select a priority for the corresponding server. Likewise, setting information input through a setting screen is stored in the storage unit 140.

The control unit 120 controls the UI processing unit 150 to configure an integrated UI according to setting information stored in the storage unit 140. If a status of server registration changes or an additional request of a user is input through the setting screen, as illustrated in FIG. 4, the UI processing unit 150 configures a new integrated UI and updates the new integrated UI. Whether a single URL is registered or a plurality of URLs is registered, if only one URL is activated in the second area 32, it is not required for the UI processing unit 150 to configure an additional integrated UI and the UI processing unit 150 may provide a UI provided by the corresponding server.

If data is received from a server through the communication unit 110, the control unit 120 uses a method of crawling to collect information based on link information corresponding to applications. Accordingly, the control unit 120 may collect HTML sources of the applications, extract information required to configure an integrated UI from the collected information, and configure the integrated UI.

HTML includes tags comprising a beginning and an end linguistically. Each tag has a distinctive feature relating to a web. A basic pattern of tags comprising HTML is as follows:

```
<html>
  <body>
    document body
  </body>
</html>
```

Herein, it is possible to learn contents of the document body based on the beginning and the end of the body tag. Accordingly, the control unit 120 may extract information on an area defined by the body tag in HTML data as the application information. The extracted application information is provided to the UI processing unit 150.

Figure 5:
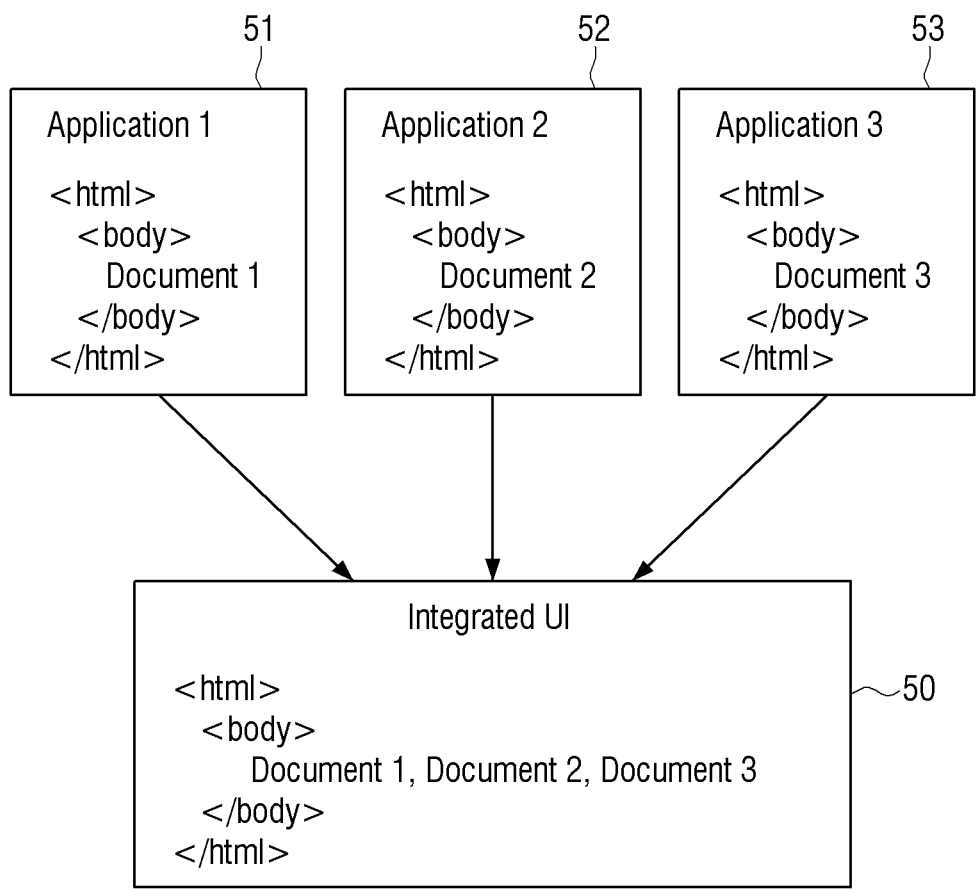
FIG. 5 illustrates a process of extracting application information from HTML data.

FIG. 5 illustrates a process of extracting applications from HTML data. Referring to FIG. 5, the control unit 120 collects data elements 51, 52, and 53 received from three different servers, analyzes HTML patterns of each data element, and extracts "document 1, document 2, document 3", which is information on areas defined by a body tag of each data element. The UI processing unit 150 reconfigures the extracted information as a body tag and generates one HTML data element 50 for an Integrated UI. The generated HTML data element 50 is stored in the storage unit 140.

Meanwhile, in order to facilitate application development, an SDK (Software Development Kit) may be provided. If an application is created by the SDK, a unique string may be inserted into the application. For example, an HTML structure into which a unique string is inserted may be displayed as follows:

```
<html>
  <body>
    document body
    <!—SDK apps begins-->
    body of Apps for Integrated UI
    <!—kinds of SDK apps-->
  </body>
</html>
```

The above-described HTML sources include unique strings combining HTML annotation tags (<!--, -->) with strings "SDK Apps begins" and "SDK Apps finishes". A server may specify an area where application information is input using such unique strings and the image forming device 100 may extract the application information from the area. If document contents are extracted by the unique strings, the unique strings may be inserted into an application more than once as well as into a single position.

Figure 6:
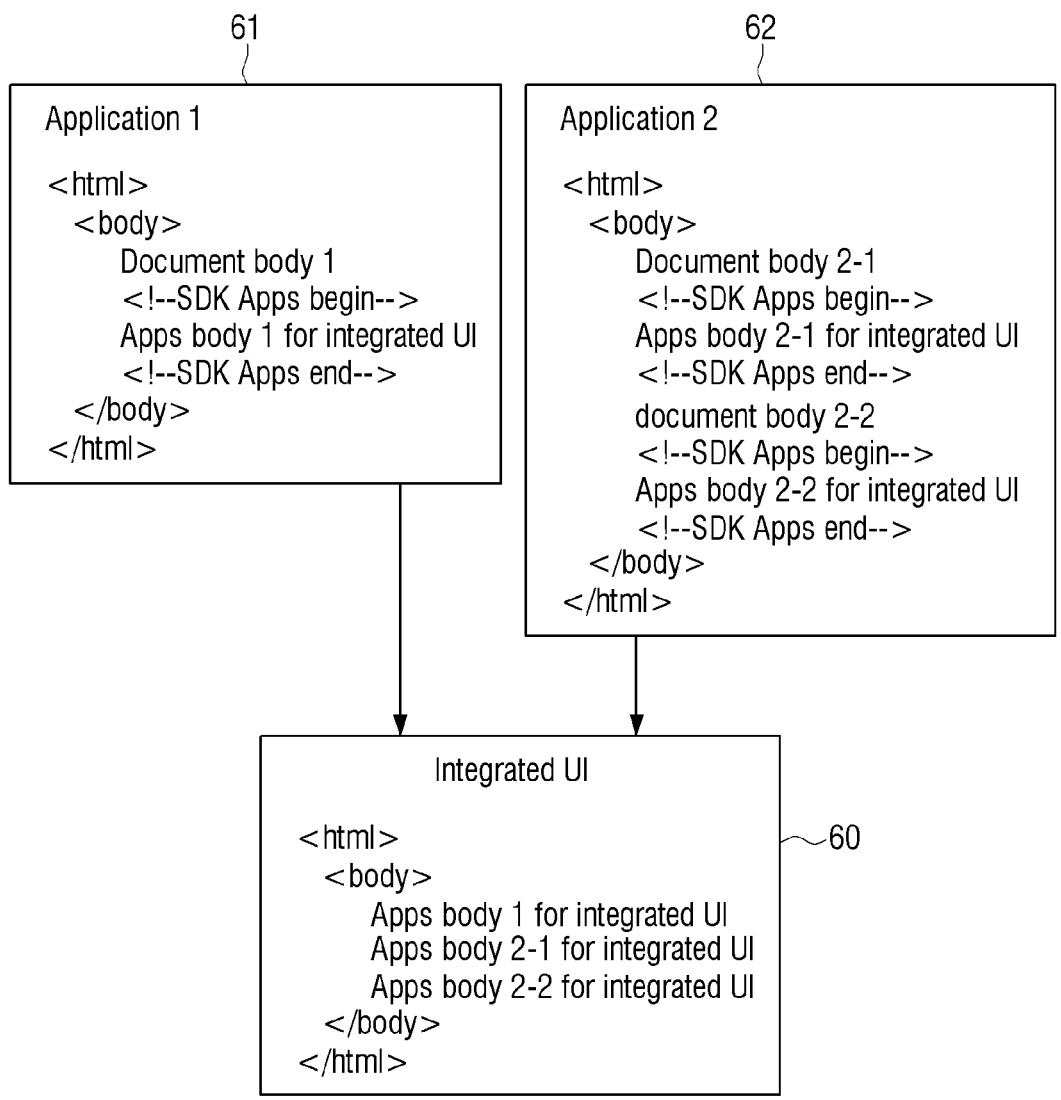
FIG. 6 illustrates a process of extracting application information using unique strings.

FIG. 6 illustrates a process of configuring an integrated UI using unique strings. Referring to FIG. 6, application 1 61 includes information, such as "Apps body 1 for integrated UI", and application 2 62 includes information, such as "Apps body 2-1 for integrated UI" and "Apps body 2-2 for integrated UI".

The control unit 120 parses unique strings pre-defined in data 61 and 62 received from each server and detects data, such as "Apps body 1 for integrated UI", "Apps body 2-1 for integrated UI", and "Apps body 2-2 for integrated UI". The detected data is provided to the UI processing unit 150. The UI processing unit 150 generates data 60 for integrated UI including the detected "Apps body 1 for integrated UI", "Apps body 2-1 for integrated UI" and "Apps body 2-2 for integrated UI".

Meanwhile, if priorities are set for each server as described above, an integrated UI is configured so that application information extracted from HTML of a high-priority server may be positioned above the integrated UI by reflecting the priorities. The integrated UI may be configured as a UI which displays all applications of registered servers in various forms. As an example, as illustrated in FIG. 3, it may be embodied as one UI 20 in which a selection menu for all applications supported by each server is enumerated.

The integrated UI may display applications to be classified according to each server.

Figure 7:
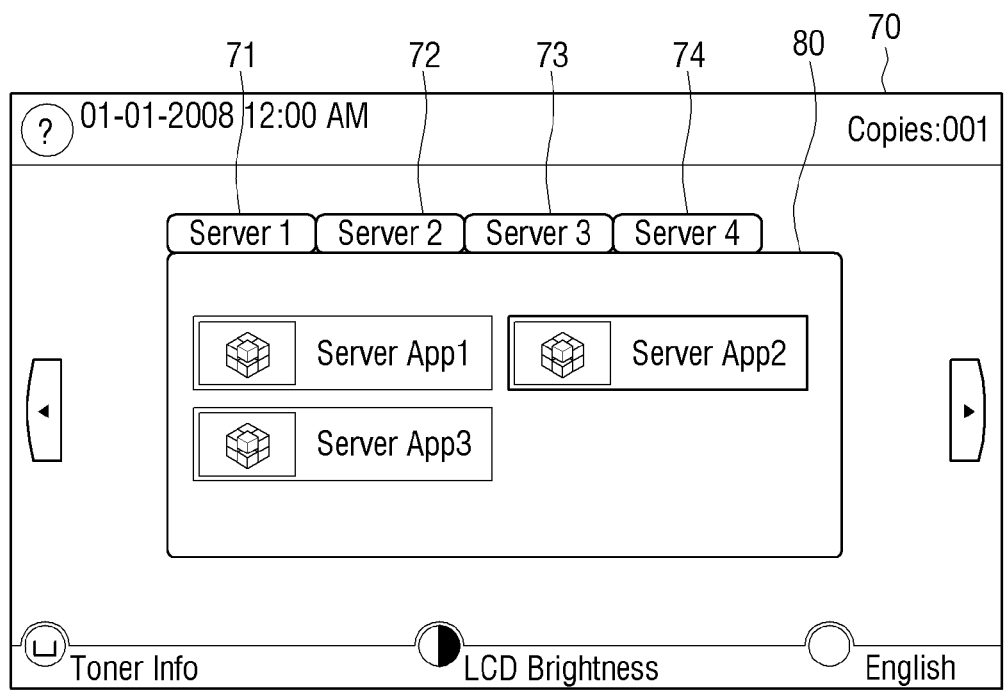
FIG. 7 illustrates another example of an integrated UI.

FIG. 7 illustrates an example of an integrated UI where applications are displayed to be classified by tabs according to servers. As illustrated in FIG. 7, the integrated UI 70 may include tabs 71 to 74 for each server and an application selection menu area 80. The application selection menu area 80 is displayed in connection with a selection of each tab. That is, if Server 3 tab 73 is selected as illustrated in FIG. 7, the application selection menu area 80 is displayed as being connected to Server 3 tab 73 and shows applications provided by Server 3.

Figure 8:
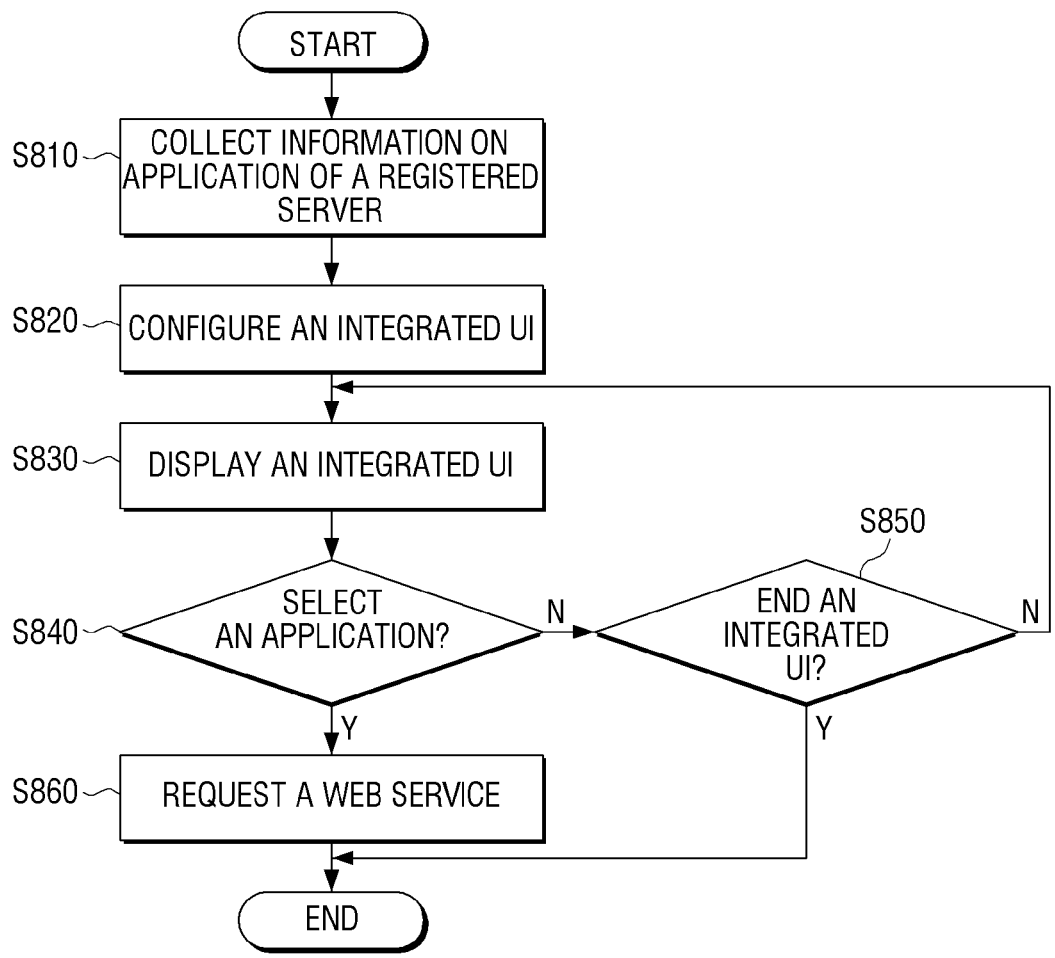
FIG. 8 is a flowchart to explain a method for providing web services according to an exemplary embodiment.

FIG. 8 is a flowchart to explain a method for providing web services according to an exemplary embodiment. Referring to FIG. 8, application information on a registered server is collected in operation S810, and an integrated UI is configured by using the collected information in operation S820. Then, the integrated UI is displayed in operation S830.

According to the exemplary embodiments, the collecting application information, configuring an integrated UI, and displaying the integrated UI in operation S810, operation S820, and operation S830 may be taken whenever a web service menu is selected from a waiting screen, a pre-defined event takes place, application information is collected, or an integrated UI is configured and stored, and when a web service menu is selected, the stored integrated UI may be read and displayed.

If the integrated UI is displayed, a user may select an application from the integrated UI. If an application is selected in operation S840, the image forming device 100 makes a request for execution of the application to a server corresponding to the selected application in operation S860. If the server receiving the request executes the application, a web service is provided to the image forming device 100 according to the execution result. Accordingly, a variety of services is supported by accessing web servers without an additional host PC. There is no limit to web services which can be supported. For example, map search and download, electronic payment, scan to email, contents search and check, and other various services may be supported.

Meanwhile, if an end condition is met, such as selecting an end menu on an integrated UI without selecting any application, or a predetermined period of time has passed, for example, the integrated UI may be closed and be changed into a waiting screen in operation S850.

Further details about configurations of a waiting screen and an integrated UI will not be provided because they are described in the above-mentioned exemplary embodiments.

Meanwhile, if application information is already secured, collecting application information of a registered server may not be performed.

Figure 9:
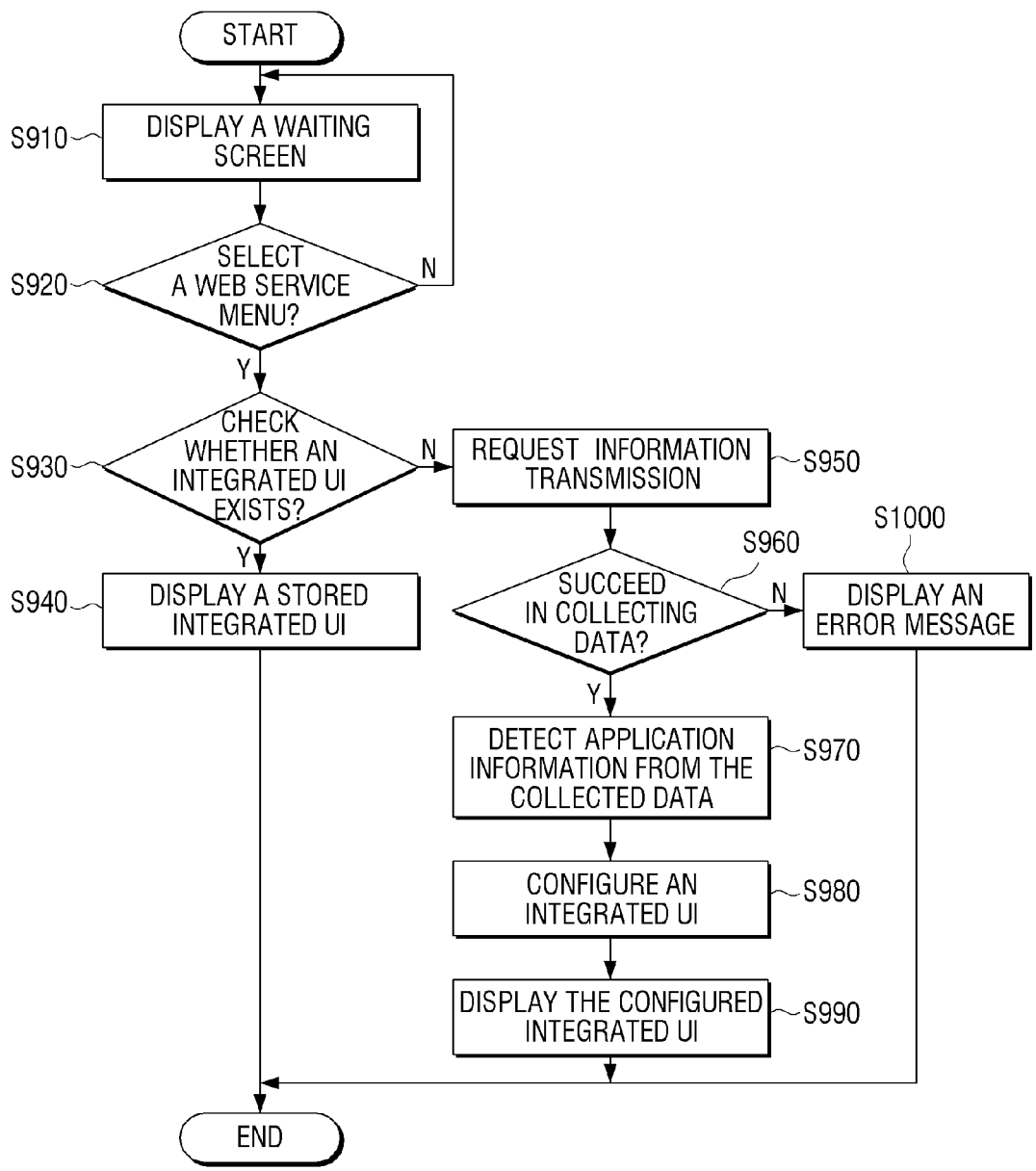
FIG. 9 is a flowchart to explain a method for displaying an integrated UI according to an exemplary embodiment.

FIG. 9 is a flowchart to explain a method for displaying an integrated UI according to an exemplary embodiment. Referring to FIG. 9, in a state of displaying a waiting screen in operation S910, if a user selects a web service menu in operation S920, the existence of an integrated UI is confirmed in operation S930. If a stored integrated UI exists according to the confirmation result, the stored integrated UI is displayed in operation S940.

On the other hand, if an integrated UI is not stored, a request for transmitting information is made to each server by using registered server information in operation S950. If data including application information is received from each server according to the request in operation S960, the application information is detected from the collected data in operation S970.

In addition, the integrated UI is configured by using the detected application information in operation S980, and then the configured integrated UI is stored and displayed in operation S990. Meanwhile, in case of a failure to collect data in operation S960, an error message may be displayed in operation S1000. In this case, if it is set to recollect data a multiple number of times, it is possible to repeat the above-described steps in operation S950 and in operation S960 by resending the request for transmitting information.

Meanwhile, if another menu is selected from the waiting screen rather than a web service menu in operation S920, an operation corresponding to the selected menu is performed.

FIGS. 8 and 9 illustrate performing a method for providing web services or displaying an integrated UI, but operations according to exemplary embodiments illustrated in FIGS. 1 to 7 may be further included. That is, the details about the device may be applied to a method for providing web services or displaying an integrated UI according to exemplary embodiments.

For instance, the method may further include displaying a setting screen to register a server or storing information on a server registered on a setting screen. The setting screen may be realized as illustrated in FIG. 4.

In addition, extracting application information from an area defined by a body tag or a unique string may be further included.

An integrated UI displayed by a method described in FIGS. 8 and 9 may be realized as various forms as illustrated in FIGS. 3 and 7.

As described above, if applications of each server physically dispersed are shown as an integrated UI, an inconvenience is overcome in which UIs for each server should be checked one by one in order to execute a necessary application. In addition, all applications can be understood intuitively, resulting in a considerable increase in user convenience.

Meanwhile, the above-described exemplary embodiments are described based on the image forming device 100, but the concept of the disclosure may not be applied only to the image forming device 100. That is, the above-described exemplary embodiments may be realized in a variety of types of devices such as a cellular phone, tablet PC, electronic frame, TV, PDA, e-book, or MP3 player, for example.

In addition, a program to perform the method for providing a web service or displaying an integrated UI may be prepared and stored in a recording medium. A device equipped with such a recording medium may execute the program to perform the method for providing a web service or displaying an integrated UI.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image forming device, comprising:
a memory, a communicator connected to a network, a user interface (UI) processor, a display, and a controller, the controller configured to:
in response to a request to access a setting menu:
control the display to display a setting screen for registering a plurality of servers; and
receive a plurality of servers to be registered via the setting screen, wherein receiving a particular server includes entering, by a user, a server address for accessing application information concerning one or more applications supported by the particular server and setting a priority for the particular server; store in the memory the received plurality of servers as a plurality of registered servers;
control the communicator to collect the application information from each of the plurality of registered servers;
control the UI processor to configure an integrated UI to display representations of applications supported by the plurality of servers including any duplicate applications;
control the display to display the integrated UI according to the set priority for each of the plurality of registered servers; and
in response to a selection by a user of an application representation from the integrated UI, request a web service from a registered server supporting the selected application representation.

2. The device as claimed in claim 1, wherein the setting screen comprises a first area to input server addresses, a second area to input whether to display any application on the integrated UI supported by each server of the plurality of registered servers, and a third area to set the priority for each server of the plurality of registered servers.

3. The device as claimed in claim 1, the controller further configured to control the display to display a waiting screen including a web service menu; and
in response to a user selection of the web service menu from the waiting screen, request the application information from the plurality of registered servers.

4. The device as claimed in claim 3, the controller further configured to:
in response to a user selection of the web service menu:
control the UI processor to request the application information from the plurality of servers registered in the memory; and
to update the integrated UI by using application information received according to the request.

5. The device as claimed in claim 3, the controller further configured to:
in response to a pre-defined event:
control the UI processor to request the application information from the plurality of servers registered in the memory;
reconfigure the integrated UI according to the requested application information; and
control the display to store the reconfigured integrated UI and, in response to a user selection of the web service menu, to display the reconfigured integrated UI.

6. The device as claimed in claim 1, wherein the collecting the application information from each of the plurality of registered servers comprises:
receiving HTML data;
extracting information of an area defined by a body tag in the HTML data as the application information; and
providing the information to the UI processor.

7. The device as claimed in claim 1, wherein the collecting the application information from each of the plurality of registered servers comprises:
parsing a unique string pre-defined in data received from the server;
extracting data of an area defined by the parsed unique string as the application information; and
providing the extracted data to the UI processor.

8. The device as claimed in claim 1, wherein the integrated UI is a UI in which a selection menu of all applications supported by the plurality of servers is enumerated.

9. A method for providing a web service to an image forming device, the method comprising:
in response to a request to access a setting menu:
displaying a setting screen for registering a plurality of servers; and
registering the plurality of servers via the setting screen, wherein registering a particular server includes entering, by a user, a server address for accessing application information concerning one or more applications supported by the particular server and setting a priority for the particular server;
collecting the application information from each of the plurality of registered servers in the image forming device;
configuring an integrated user interface (UI) to display a representation for each application supported by the plurality of registered servers;
displaying the integrated UI according to the set priority for each of the plurality of registered servers; and
in response to selecting an application representation from the integrated UI, requesting a web service from a server of the plurality of registered servers supporting the selected application representation.

10. The method as claimed in claim 9, wherein the registering the plurality of servers further comprises:
storing information on each server of the plurality of servers registered on the setting screen.

11. The method as claimed in claim 10, wherein the setting screen comprises a first area to input server addresses, a second area to input whether to display any application on the integrated UI supported by each server of the plurality of registered servers, and a third area to set the priority for each server of the plurality of registered servers.

12. The method as claimed in claim 9, further comprising:
displaying a waiting screen including a web service menu; and
in response to a user selection of the web service menu from the waiting screen, requesting the application information from the plurality of registered servers.

13. The method as claimed in claim 9, further comprising:
in response to a pre-defined event:
requesting the application information from the plurality of registered servers;
reconfiguring the integrated UI according to the requested information; and
storing the reconfigured integrated UI.

14. The method as claimed in claim 9, wherein collecting the application information from each of the plurality of registered servers comprises:
receiving HTML data from the registered server; and
extracting information input in a body tag within the HTML data as the application information.

15. The method as claimed in claim 9, wherein collecting the application information from each of the plurality of registered servers comprises:
receiving data from the registered server;
parsing a pre-defined unique string within the received data; and
extracting data of an area specified by the unique string as the application information.

16. The method as claimed in claim 9, wherein the integrated UI is a UI in which a selection menu of all applications supported by the plurality of servers is enumerated.

17. A non-transitory computer-readable recording medium storing a program to perform a method for providing a web service to an image forming apparatus, the method comprising:
in response to a request to access a setting menu:
displaying a setting screen for registering a plurality of servers; and
registering the plurality of servers via the setting screen, wherein registering a particular server includes entering, by a user, a server address for accessing application information concerning one or more applications supported by the particular server and setting a priority for the particular server;
collecting the application information from each of the plurality of registered servers in the image forming apparatus;
configuring an integrated user interface (UI) to display a representation for each application supported by the plurality of registered servers;
displaying the integrated UI according to the set priority for each of the plurality of registered servers; and
in response to selecting an application representation from the integrated UI, requesting a web service from a server of the plurality of registered servers supporting the selected application.

* * * * *